(12) United States Patent
Sueyoshi et al.

(10) Patent No.: US 7,610,488 B2
(45) Date of Patent: *Oct. 27, 2009

(54) DATA PROCESSING DEVICE AND METHOD AND PROGRAM OF SAME

(75) Inventors: Masahiro Sueyoshi, Kanagawa (JP); Kei Tateno, Tokyo (JP); Yoshiaki Hirano, Kanagawa (JP); Katsuyuki Teruyama, Tokyo (JP)

(73) Assignee: Sony Corporation, Tokyo (JP)

( * ) Notice: Subject to any disclaimer, the term of this patent is extended or adjusted under 35 U.S.C. 154(b) by 679 days.

This patent is subject to a terminal disclaimer.

(21) Appl. No.: 10/791,760

(22) Filed: Mar. 4, 2004

(65) Prior Publication Data

US 2004/0230801 A1 Nov. 18, 2004

(30) Foreign Application Priority Data

Mar. 14, 2003 (JP) .............................. 2003-070301

(51) Int. Cl.
*H04L 9/32* (2006.01)
(52) U.S. Cl. ...................................... 713/169
(58) Field of Classification Search ................. 713/172, 713/169
See application file for complete search history.

(56) References Cited

U.S. PATENT DOCUMENTS

| 5,825,875 A * | 10/1998 | Ugon ........................... 705/65 |
| 5,923,756 A * | 7/1999 | Shambroom ................. 713/156 |
| 7,010,688 B1 * | 3/2006 | Kawasaki .................... 713/168 |
| 2002/0023216 A1 * | 2/2002 | Noguchi et al. ............. 713/171 |
| 2002/0194475 A1 * | 12/2002 | Ishiguro et al. ............. 713/168 |
| 2006/0104449 A1 * | 5/2006 | Akkermans et al. ......... 380/277 |

FOREIGN PATENT DOCUMENTS

| JP | 10-51439 | 2/1998 |
| JP | 11-196083 | 7/1999 |
| JP | 11-289327 | 10/1999 |
| JP | 2000-59323 | 2/2000 |
| JP | 2001-274791 | 10/2001 |
| JP | 2001-306401 | 11/2001 |
| JP | 2003-132253 | 5/2003 |
| JP | 2003-143128 | 5/2003 |

OTHER PUBLICATIONS

U.S. Appl. No. 10/792,574, filed Mar. 4, 2004, Tateno et al.

* cited by examiner

*Primary Examiner*—Gilberto Barron, Jr.
*Assistant Examiner*—Cordelia Kane
(74) *Attorney, Agent, or Firm*—Oblon, Spivak, McClelland, Maier & Neustadt, L.L.P.

(57) ABSTRACT

A data processing device able to keep a technique for generation of the key data in a key generating means secret from a developer of an authenticating means, wherein an authentication program has a description for calling up a function in a key generation program and entering identification data of service etc. input from an IC of an IC card as input parameters of the function and wherein a key generation program generates a key by using the identification data written at predetermined addresses as input parameters in accordance with the execution of a code on the basis of the authentication program.

29 Claims, 12 Drawing Sheets

DATA PROCESSING DEVICE AND METHOD AND PROGRAM OF SAME

BACKGROUND OF THE INVENTION

1. Field of the Invention

The present invention relates to a data processing device for authentication with a service data storing device by using key data and a method and program of the same.

2. Description of the Related Art

For example, there is a data processing device which performs authentication with a service data storing device on the basis of key data and performs various processing after confirming legitimacy of the other party by the authentication. Such a data processing device has for example an authentication function for authentication on the basis of key data and a key generation function for generating key data. The data processing device is configured by the above authentication function and key generation function mixed together.

Summarizing the problems to be solved by the invention, there is a demand to have different developers develop the authentication function and key generation function in the data processing device and to keep the key generation algorithm used by the key generation function secret from the developer of the authentication function. In the data processing devices, however, there is the problem that the authentication function and the key generation function are mixed, so it is difficult to meet the above demand.

SUMMARY OF THE INVENTION

An object of the present invention is to provide a data processing device able to keep the technique for generation of the key data in the key generating means secret from the developer of the authenticating means and a method and program of the same.

To attain the above object, according to a first aspect of the invention, there is provided a data processing device comprising an authenticating means for authentication with a device to be authenticated on the basis of key data and a key generating means for generating the key data on the basis of the data received from the authenticating means and providing the same to the authenticating means, wherein the authenticating means provides first data and second data to the key generating means, and the key generating means generates the key data by using only the first data in the first data and the second data received from the authenticating means.

The mode of operation of the data processing device of the first aspect of the invention is as follows: The authenticating means provides the first data and the second data to the key generating means,. The key generating means generates the key data by using only the first data in the first data and the second data received from the authenticating means. The authenticating means performs the authentication with the device to be authenticated on the basis of the key data generated by the key generating means.

Preferably the key generating means generates key data unique to the device to be authenticated on the basis of the data received from the authenticating means. Further, preferably the key generating means is provided with a function module having a first input parameter and a second input parameter and generating the key data by using only the first data entered for the first input parameter, and the authenticating means enters the first data for the first input parameter of the function module of the key generating means and enters the second data for the second input parameter.

According to a second aspect of the invention, there is provided a data processing method for authentication by an authenticating means with a device to be authenticated on the basis of key data generated by a key generating means, comprising a first step of having the authenticating means provide first data and second data to the key generating means; a second step of having the key generating means generate key data by using only the first data in the first data and the second data obtained at the first step and provide the key data to the authenticating means; and a third step of having the authenticating means authenticate with the device to be authenticated on the basis of the key data received at the second step.

According to a third aspect of the invention, there is provided a program executing a step for providing key data to an authentication program executing a step for authentication with a device to be authenticated on the basis of key data and executed in a data processing device, having steps of a first step for receiving first data and second data from the authentication program; a second step for generating the key data by using only the first data in the first data and the second data received at the first step; and a third step for providing the key data generated by the second step to the authentication program.

According to a fourth aspect of the invention, there is provided a secure application module for communicating with an IC chip storing service date relating to at least one service, comprising: an authenticating circuit for authentication with a device to be authenticated on the basis of key data and a key generating circuit for generating the key data on the basis of the data received from the authenticating circuit and providing the same to the authenticating circuit, wherein the authenticating circuit provides first data and second data to the key generating circuit, and the key generating circuit generates the key data by using only the first data in the first data and the second data received from the authenticating circuit.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
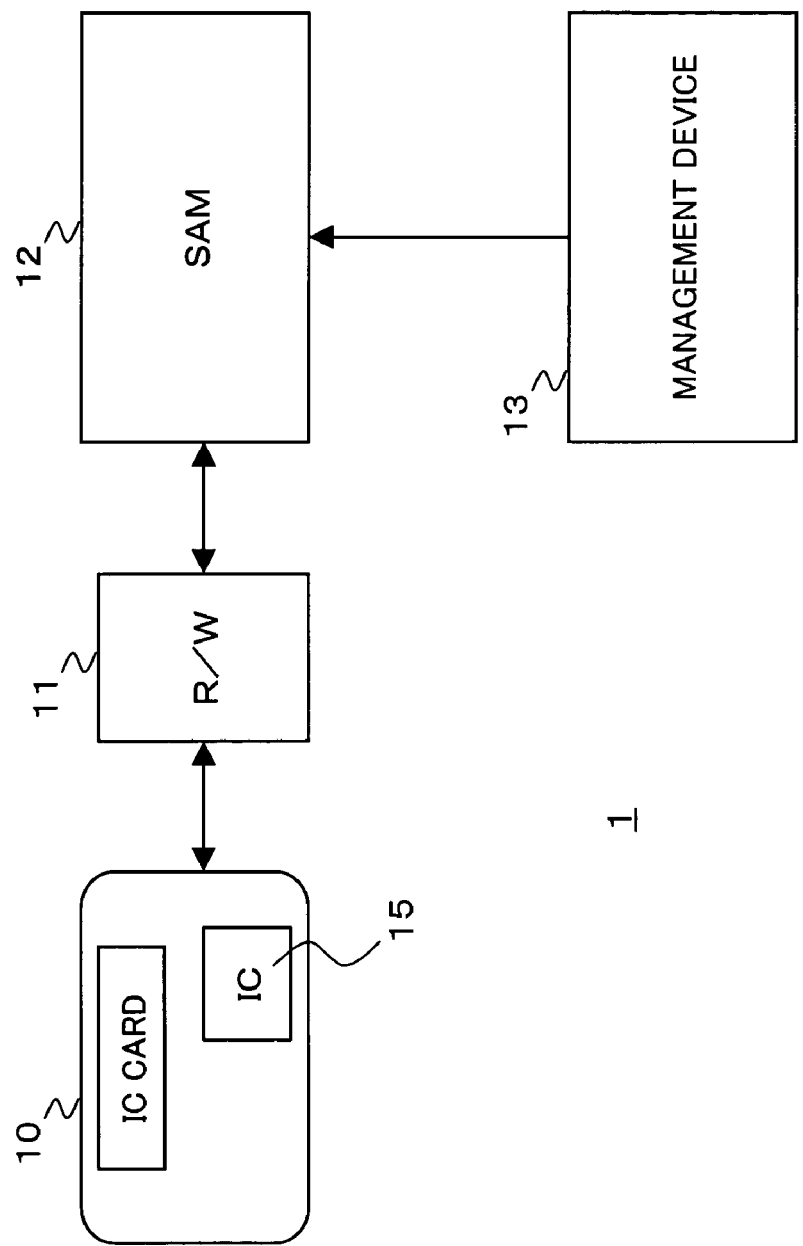
FIG. 1 is a view of the configuration of a card system of an embodiment of the present invention.

Below, an explanation will be given of a card system according to an embodiment of the present invention. FIG. 1 is a view of the configuration of a card system 1 of the present embodiment. As shown in FIG. 1, the card system 1 performs processing concerning a predetermined service after for example an integrated circuit (IC) 15 of an IC card 10 and a secure application module (SAM) 12 perform authentication via a reader/writer (R/W) 11. Here, the SAM 12 corresponds to the data processing device of the present invention, and the IC 15 corresponds to the device to be authenticated of the present invention. The IC stores service data relating to at least one service. The SAM communicates with a semiconductor device such as IC card, portable electronic device which has an IC card function.

Further, a management device 13 registers a key package KP storing the key data etc. to be used for the mutual authentication between the SAM 12 and the IC 15 in the SAM 12. Further, a manager of the SAM 12, for example, the provider of a predetermined service utilizing the IC card 10, issues an IC card 10 to each of a plurality of users.

The IC 15 stores data concerning various services received by the user of the IC 15 utilizing the SAM 12 and file data of programs as will be explained later and is set with rights of use for services using the file data. Specifically, the IC 15 and the SAM 12 perform mutual authentication on the basis of key data linked with a designated service. When they confirm the legitimacy of each other, the IC 15 and the SAM 12 perform the processing related to the service in cooperation. In the present embodiment, the IC card 10 issued to each of the plurality of users is allocated the key data unique to the individual IC card 10 (key data or individual key data of the present invention) as part of the key data to be used for the authentication. The SAM 12 receives as input the unique data of the IC card 10, for example, a serial number uniquely allocated to the IC card 10 at the time of production or other device identification data IDM and a plurality of identification data SID1, SID2, and SID3 for identifying the designated service etc. from the IC card 10 and generates the key data to be used for the authentication by the predetermined algorithm on the basis of these.

Below, an explanation will be given of the components shown in FIG. 1.

Figure 2:
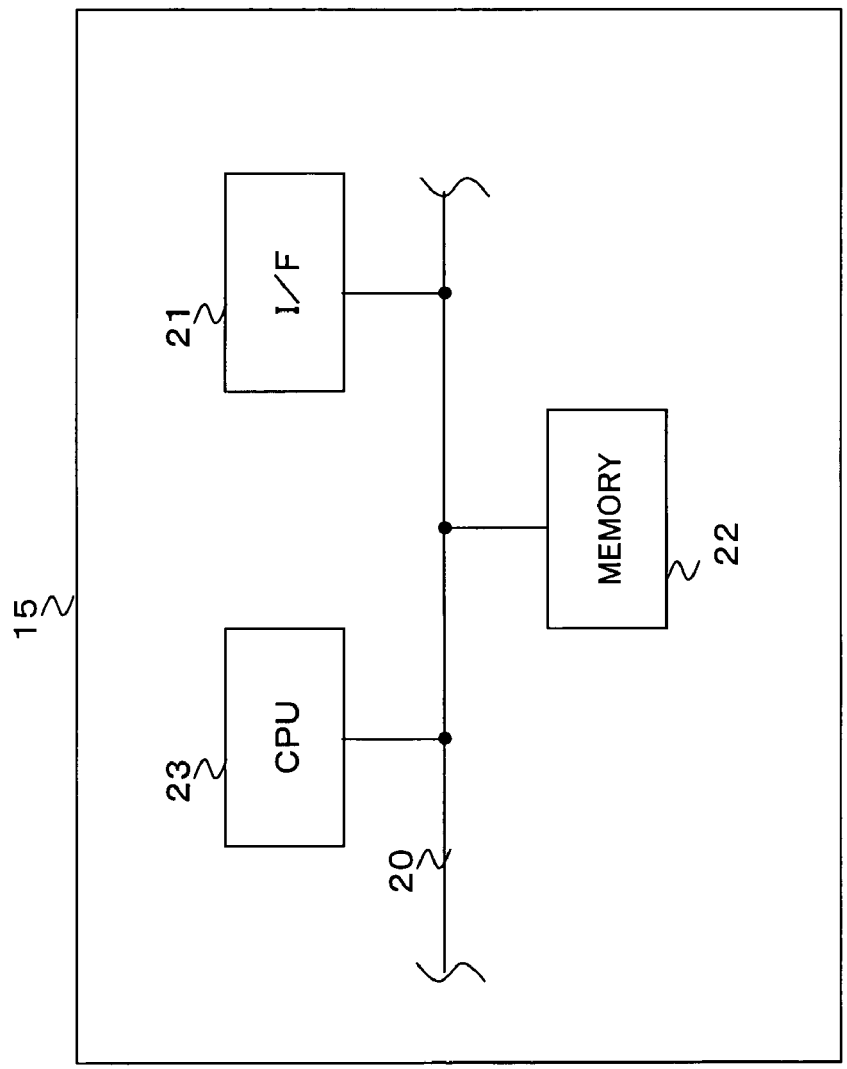
FIG. 2 is a view of the configuration of an IC built in an IC card shown in FIG. 1.

IC 15:

FIG. 2 is a view of the configuration of an IC 15 built into the IC card 10 shown in FIG. 1. As shown in FIG. 2, the IC 15 has for example an interface 21, a memory 22, and a CPU 23 connected via an internal bus 20. The interface 21 transfers data with the SAM 12 via the R/W 11. The memory 22 stores data to be used for processing concerning the various services received by the user of the IC 15 by utilizing the SAM 12 and the file data of the programs. Further, the memory 22 stores various key data used for the authentication with the SAM 12 before performing the processing relating to the services. Further, the memory 22 stores the device identification data IDM unique to the individual IC card 10.

Note that the SAM 12 performs mutual authentication on the basis of the key data linked with the system code allocated commonly to SAMs 12 of the models. Access to the IC 15 is approved conditional on mutual legitimacy being recognized by the mutual authentication. Further, the memory 22 stores the file data of various services in areas as folders having hierarchical structures. The SAM 12 performs the mutual authentication on the basis of the key data linked with the area code of the area in the memory 22, and the access with respect to the area is permitted under such a condition that the mutual legitimacy is recognized by the mutual authentication. Further, the SAM 12 performs the mutual authentication on the basis of the key data linked with the service code of the file data stored in the area. Access to the file data is approved conditional on mutual legitimacy being recognized by the mutual authentication.

Figure 3:
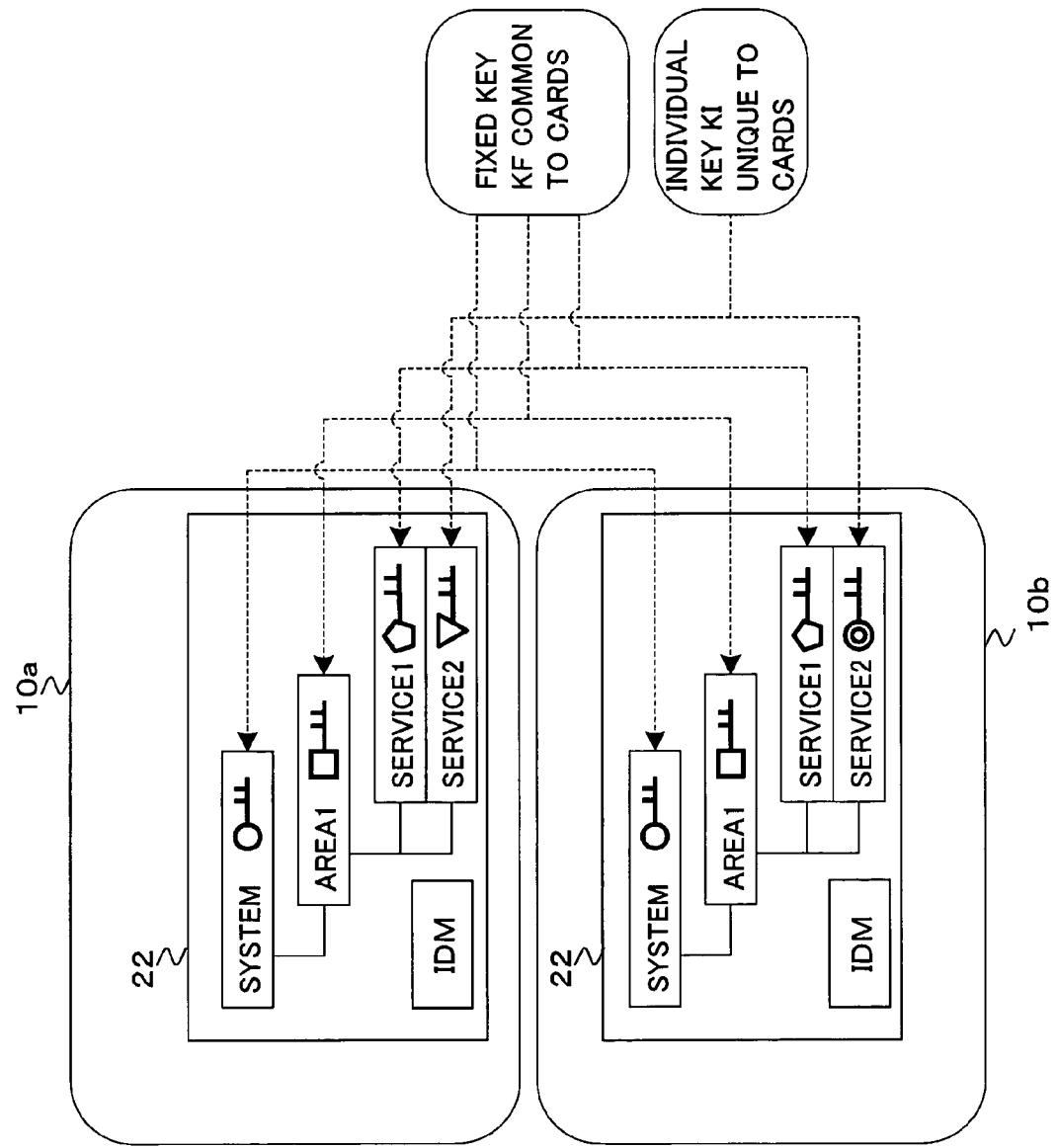
FIG. 3 is a view for explaining various key data defined in the IC shown in FIG. 1.

In the present embodiment, as shown in FIG. 3, fixed key data and individual key data are defined as the type of the key data defined as explained above concerning the IC 15. The fixed key data is key data of the same value among ICs 15 of a plurality of IC cards 10 so far as the positions in the file system are the same. That is, the fixed key data is key data shared by the ICs 15 of a plurality of IC cards 10. The individual key data is key data of the different values among ICs 15 of a plurality of IC cards 10 even if the positions in the file system are the same. That is, the individual key data is key data unique to the IC 15 of an IC card 10. Note that an IC 15 performs processing without identifying which of the fixed key data or the individual key data the key data is.

The CPU 23 transfers data with the SAM 12 and performs mutual authentication with the SAM 12 via the interface 21 and the R/W 11 on the basis of a program read from the memory 22 and the key data. Further, when confirming mutual legitimacy by the mutual authentication, the CPU 23 executes the processing concerning the service linked with the key data used in the mutual authentication in cooperation with the SAM 12. Further, the CPU 23 decodes the enciphered key package via the interface 21 in accordance with an operation of a manager whose predetermined right has been authenticated at the time of for example the issuance of the IC card 10 and writes the key data in the decoded key package into the memory 22.

Figure 4:
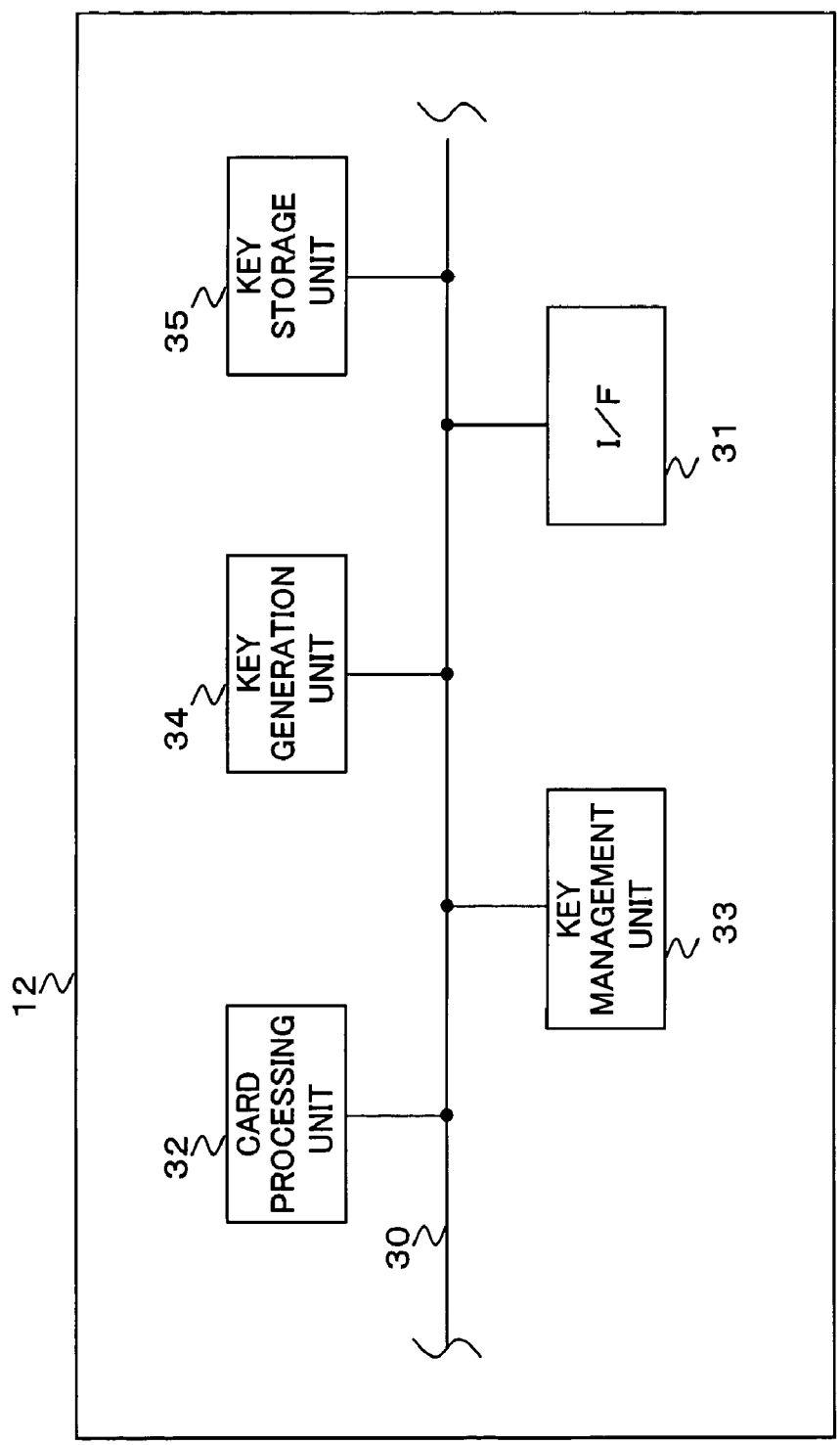
FIG. 4 is a functional block diagram of a SAM shown in FIG. 1.
Figure 5:
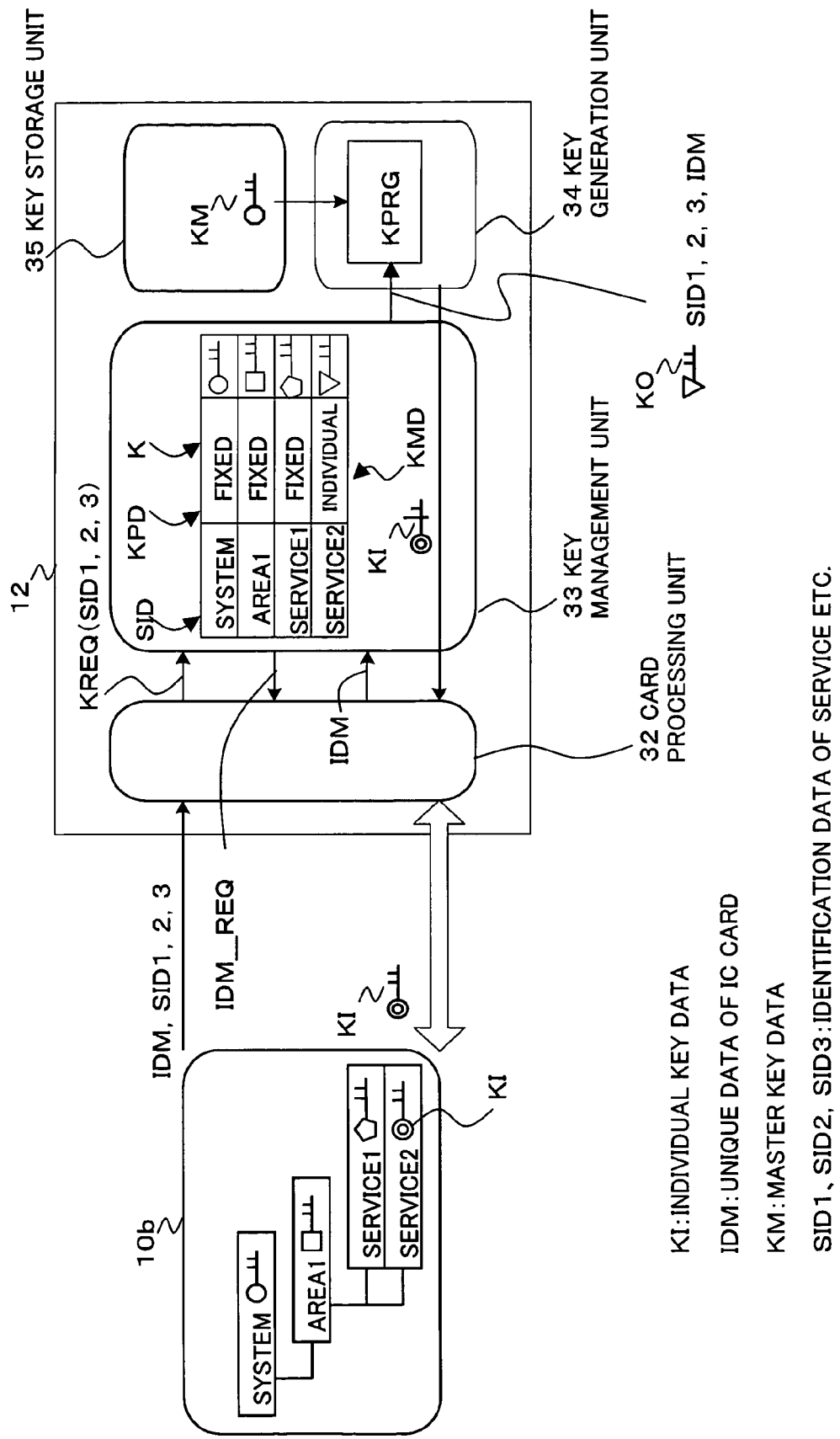
FIG. 5 is a view for explaining processing of the SAM shown in FIG. 4.
Figure 6:
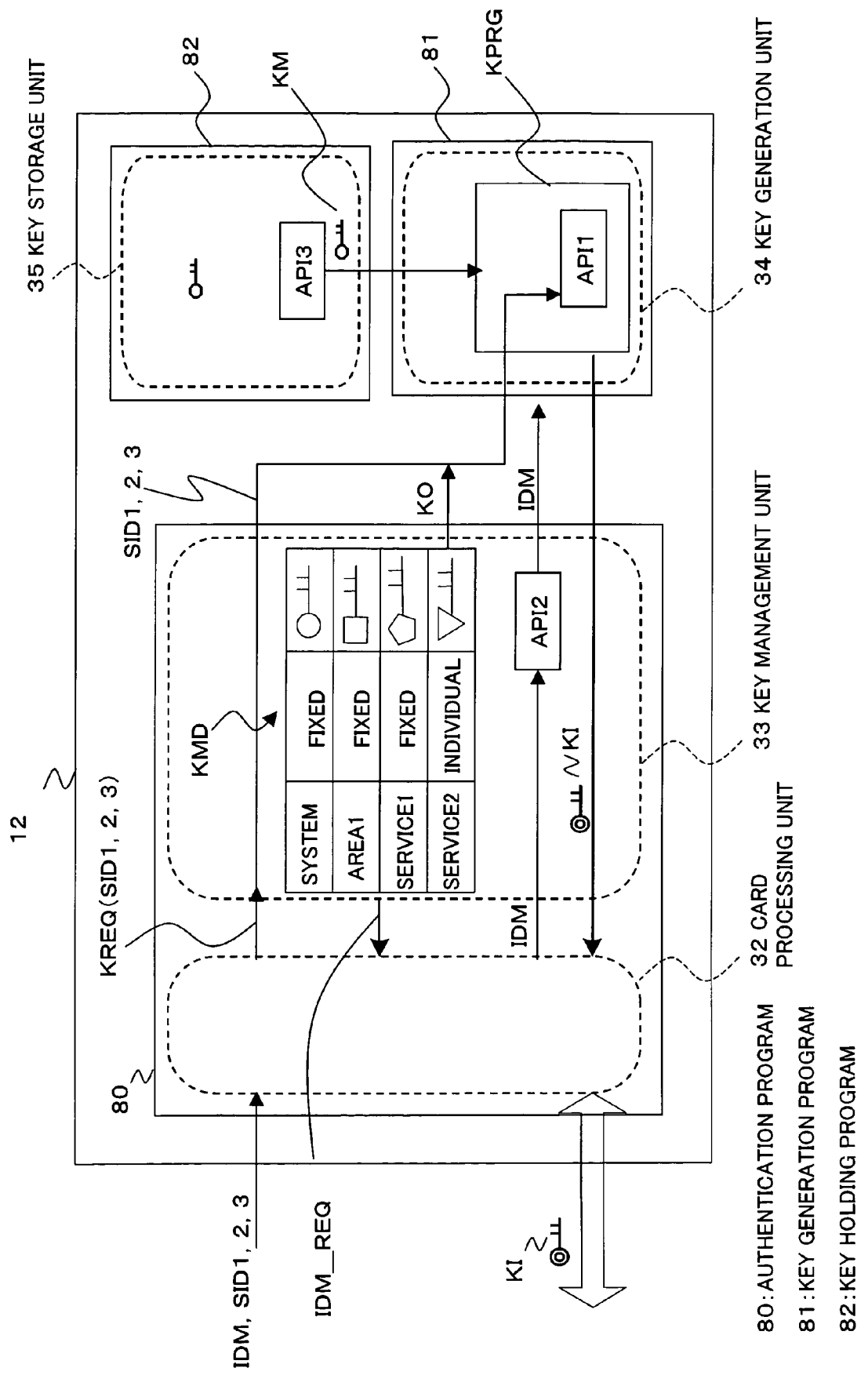
FIG. 6 is a view for explaining a software configuration of the SAM shown in FIG. 5.

SAM 12:

FIG. 4 is a functional block diagram of the SAM 12 shown in FIG. 1; FIG. 5 is a view for explaining the flow of the data of the SAM 12 at the time of the authentication; and FIG. 6 is a view for explaining the software configuration of the SAM 12. As shown in FIG. 4, the SAM 12 has for example an interface 31, a card processing unit 32, a key management unit 33, a key generation unit 34, and a key storage unit 35 connected via an internal bus 30. In the present embodiment, the card processing unit 32 and the key management unit 33 correspond to the authenticating means of the present invention, the key generation unit 34 corresponds to the key generating means of the present invention, and the key storage unit 35 corresponds to the key retaining means of the present invention.

The components of the SAM 12 shown in FIG. 4 may be realized by circuits or computer programs.

Further, as shown in FIG. 6, the card processing unit 32 and the key management unit 33 are realized by execution of an authentication program 80 (authentication program of the present invention) at a CPU (not shown) or other data processing device (executing means or data processing device of the present invention). The key generation unit 34 is realized by execution of a key generation program 81 (program or key generation program of the present invention) at a CPU or other data processing device. The key storage unit 35 is realized by executing a key storage program 82 (key storage program of the present invention) at a CPU or other data processing device.

Figure 7:
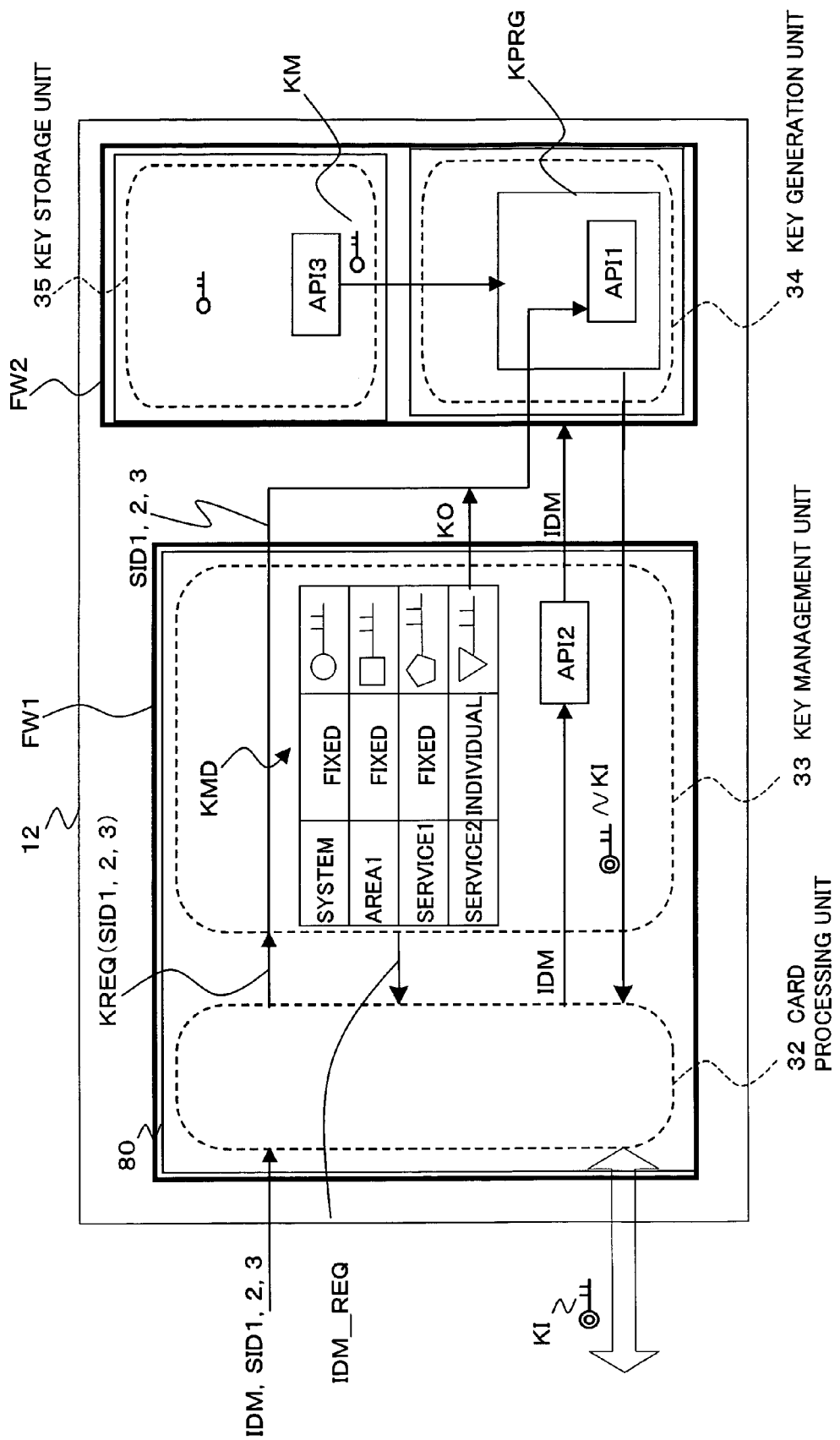
FIG. 7 is a view for explaining a firewall defined in the program in the SAM shown in FIG. 6.

In the present embodiment, as shown in FIG. 7, a firewall FW1 is defined in the authentication program 80, and a firewall FW2 is defined in the key generation program 81 and the key storage program 82. That is, due to the firewalls FW1 and FW2, the access rights to the key generation program 81 and the key storage program 82 are defined separately from the access right to the authentication program 80. Specifically, in the SAM 12, the access rights to the storage areas storing the key generation program 81 and the key storage program 82 are defined separately from the access right to the storage area storing the authentication program 80. Accordingly, even a person having the access right to the authentication program 80 is prohibited from accessing the authentication program 80 and the key generation program 81 if not having access rights to the authentication program 80 and the key generation program 81. The key storage program 82 is downloaded from the outside of the SAM 12 independently from the download of the key generation program 81 and the authentication program 80.

Further, in the present embodiment, the authentication program 80 provides the key generation program 81 with the device identification data IDM of the IC 15, a plurality of identification data SID1, SID2, and SID3 of services, etc. The key generation program 81 generates individual key data KI (key data of the present invention) on the basis of the device identification data IDM and the identification data SID2 (the first data of the present invention) among the data input from the authentication program 80. That is, the key generation program 81 does not use the identification data SID1 and SID3 (the second data of the present invention) input from the authentication program 80 for the generation of the individual key data KI.

Below, an explanation will be given of the technique for transfer of data among the key generation program 81, the authentication program 80, and the key storage program 82. In the present embodiment, as shown in FIG. 6, the authentication program 80 has a description (code) for calling up a function API1 as an application program interface (API) function in the key generation program 81 and entering the identification data SID1, SID2, and SID3 of the services etc. input from the IC 5 of the IC card as input parameters of the function API1 as shown in the following equation (1):

$$\text{API1 (SID1, SID2, SID3)} \tag{1}$$

Then, in accordance with the execution of the code on the basis of the authentication program 80, the program writes the identification data SID1, SID2, and SID3 at designated addresses in the buffer (not illustrated). In accordance with the execution of the function API1 in the key generation program 81, it generates the key using the identification data SID1, SID2, and SID3 written at the addresses as the input parameters. Note that, it is also possible for the key generation program 81 to write the identification data SID1, SID2, and SID3 at the addresses in the buffer received as returned values of execution of the API function. Note that the authentication program 80 provides the key generation program 81 with the original key data KO through the API1 function. As explained above, the SAM 12 provides the identification data SID1 to SID3 and the original key data KO from the authentication program 80 to the key generation program 81 via the API1 function defined by the key generation program 81.

The authentication program 80 has a function API2 and stores the device identification data IDM input from the IC 5 of an IC card at the address in the buffer defined as the returned value of the function API2. Then, the key generation program 81 calls up the function API2 and reads the device identification data IDM from the address defined as the returned value thereof. As explained above, the SAM 12 provides the device identification data IDM from the authentication program 80 to the key generation program 81 via the function API2 defined by the authentication program 80.

The key storage program 82 has a function API3 and stores master key data KM held by the key storage program 82 at the address in the buffer defined as the returned value of the function API3. The key generation program 81 calls up the function API3 and reads the master key data KM from the address defined as the returned value thereof. As explained above, the SAM 12 provides the master key data from the key storage program 82 to the key generation program 81 via the function API3 defined by the key storage program 82.

Note that the functions API1, API2, and API3 correspond to the function modules of the present invention.

Below, an explanation will be given of the components of the SAM 12. The interface 31 transfers data with the IC 15 via the R/W 11 shown in FIG. 1. The card processing unit 32 performs the mutual authentication with the IC 15 of the IC card 10 via the interface 31 on the basis of the key data input from the key management unit 33 and, when confirming the mutual legitimacy by the mutual authentication, performs the processing concerning the designated service in cooperation with the IC 15. The card processing unit 32 realizes various functions by executing the application program. The card processing unit 32 performs mutual authentication with the IC 15 on the basis of the key data input from the key management unit 33.

The key management unit 33 holds the key management data KMD for managing the key data to be used for the mutual authentication etc. The key management data KMD shows the identification data SID, the key data K, and the key property data KPD linked together as shown in FIG. 5. The identification data SID is data for identifying the service (file data) to be performed in cooperation with the IC 15 by the SAM 12 and the storage area (folder) etc. for accessing the IC 15 accompanied by the service. The identification data SID is for example the system code, the area code, or the service code input from the IC 15. In the present embodiment, as shown in FIG. 6, the authentication program 80 provides the device identification data IDM input from the IC 15 of the IC card and the identification data SID1, SID2, and SID3 of the service etc. to the key generation program 81.

The key data K is key data to be used for the mutual authentication with the IC 15 preceding the service. Note that the identification data SID of the processing performed on the basis of the individual key data is linked with the original key data KO mentioned above as the key data K. The key property data KPD is data indicating which of the fixed key data or the individual key data the key data K is.

When the identification data SID in the key request KREQ from the card processing unit 32 is linked with the fixed key data on the basis of the key property data KPD of the key management data KMD, the key management unit 33 reads the key data (fixed key data) K linked with the identification data SID from the key management data KMD and outputs it to the card processing unit 32. On the other hand, when the identification data SID in the key request KREQ from the card processing unit 32 is linked with the individual key data on the basis of the key property data KPD of the key management data KMD, the key management unit 33 requests the device identification data IDM from the card processing unit 32 (request IDM_REQ in FIG. 5) and outputs the input device identification data IDM, identification data SID, and the key data K linked with the identification data SID extracted from the key management data KMD (the original key data KO in FIG. 5) to the key generation unit 34. The identification data SID and the original key data KO are provided via the function API1 from the authentication program 80 to the key generation program 81 as mentioned above.

Figure 8:
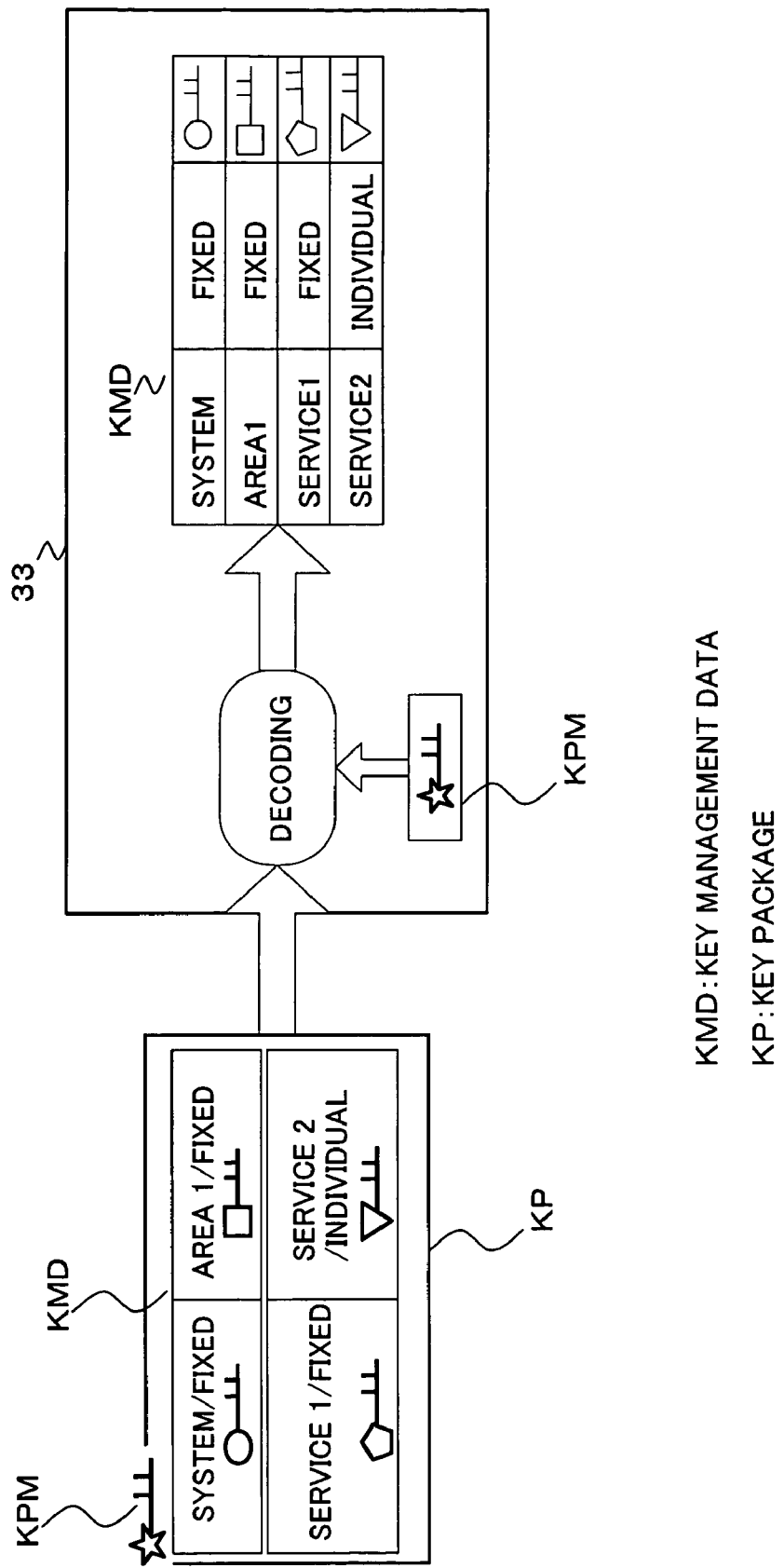
FIG. 8 is a view for explaining registration of key management data in the SAM shown in FIG. 5.

The key management data KMD is set in the key management unit 33 for example as follows. That is, the management device 13 shown in FIG. 1 generates key package data KP obtained by enciphering the key management data KMD by the setting use master key data KPM as shown in FIG. 8 and outputs this to the SAM 12. The SAM 12 decodes and holds the key package data KP input via the interface 31 at the key management unit 33 shown in FIG. 4 or a not illustrated decoding unit by using the setting use master key data KPM. Here, by having a business providing a service using the SAM 12 set the key management data KMD into the key management unit 33, the business can manage keys in a secured state and with a high degree of freedom. Note that the key data KO serving as the source of generation of the individual keys stored in the key management data KMD is not the individual key data KI itself. Therefore, even if the secrecy of the key management data KMD is lost, the secrecy of the individual key data KI itself will not be lost.

Figure 9:
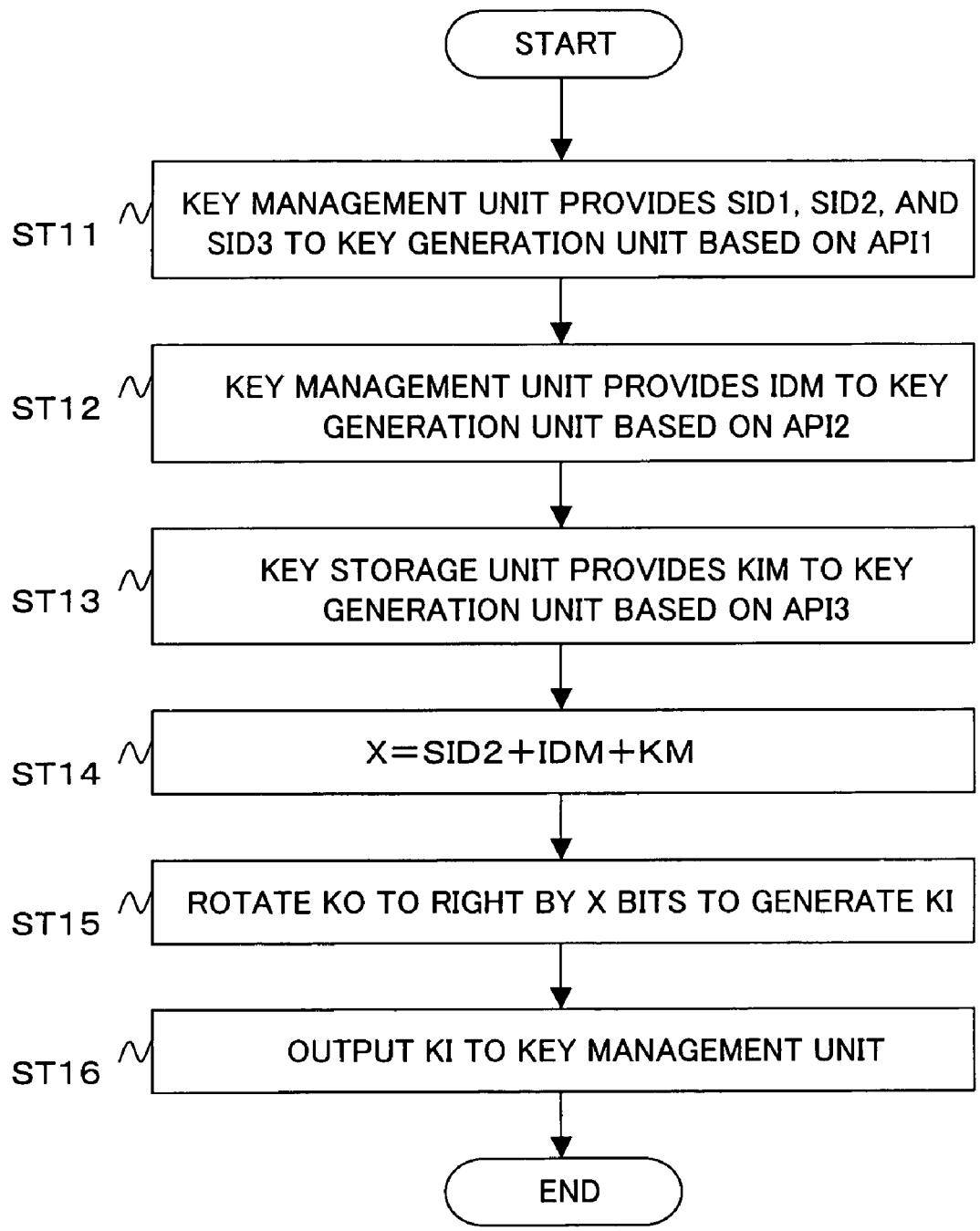
FIG. 9 is a flow chart for explaining a step for generation of individual key data in a key generation unit shown in FIG. 5.

The key generation unit 34 executes an individual key generation program KPRG on the basis of the master key data KM from the key storage unit 35, the device identification data IDM input from the key management unit 33, the identification data SID, and the key data K (KO) to generate the key data (individual key data) KI and outputs this to the key management unit 33. The key management unit 33 outputs the key data KI input from the key generation unit 34 to the card processing unit 32. The key generation unit 34 generates the key data KI by the steps shown in FIG. 9. The steps shown in FIG. 9 are described in the individual key generation program KPRG. Below, the steps shown in FIG. 9 will be explained.

Step ST11

The key generation unit 34 receives as input the identification data SID1, SID2, and SID3 and the original key data KO from the key management unit 33 on the basis of the function API1 defined by the key generation program 81 as mentioned above.

Step ST12

The key generation unit 34 receives as input the device identification data IDM from the key management unit 33 on the basis of the function API2 defined by the authentication program 80 as mentioned above.

Step ST13

The key generation unit 34 receives as input the master key data KM from the key storage unit 35 on the basis of the function API3 defined by the key storage program 82 as mentioned above.

Step ST14

The key generation unit 34 adds the identification data SID2 input at step ST11, the device identification data IDM input at step ST12, and the master key data KM input at step ST13 and generates the data X. In this way, the key generation unit 34 uses the identification data SID2 among the identification data SID1, SID2, and SID3 input at step ST11 for the generation of the data X and does not use the identification data SID1 and SID3 for the generation of the data X. Due to this, the processing of the key generation program 81 can be kept secret from the authentication program 80 defining the card processing unit 32 and the key management unit 33.

Step ST15

The key generation unit 34 rotates the original key data KO input at step ST11 to the right by exactly the amount of the value of the data X generated at step ST14 to generate the individual key data KI.

Step ST16

The key generation unit 34 outputs the individual key data KI generated at step ST13 to the key management unit 33.

Note that, as the individual key generation program KPRG to be used for the generation of the key data KI by the key generation unit 34, for example, it is also possible to provide a program of an algorithm differing for example for every processing content with the IC 15, for example, for every position of the processing target in the file system, and for example for every area code, select the program corresponding to the designated identification data SID2, and execute this. The key generation unit 34 may generate the individual key data KI without using the master key data KM. The generation steps of the individual key data shown in FIG. 7 are examples. The present invention is not limited to this.

In this way, the key generation unit 34 generates the individual key data by using the device identification data IDM, the identification data SID, and the key data K (KO) in addition to the master key data KM so as to give a role equivalent to the master key data to these data concerning the key generation. For this reason, the settings concerning the key data used by a business etc. having the right over setting the key management data KMD for the authentication can be freely changed. Further, as mentioned above, by generating the individual key data on the basis of the different algorithms by the individual key generation program KPRG on the basis of the position in the file system etc., the security can be raised more. That is, even when part of the logic for the area service is leaked, the security of the other area services can be kept.

Below, an explanation will be given of an example of the operation of the card system 1 shown in FIG. 1.

FIRST EXAMPLE OF OPERATION

Figure 10:
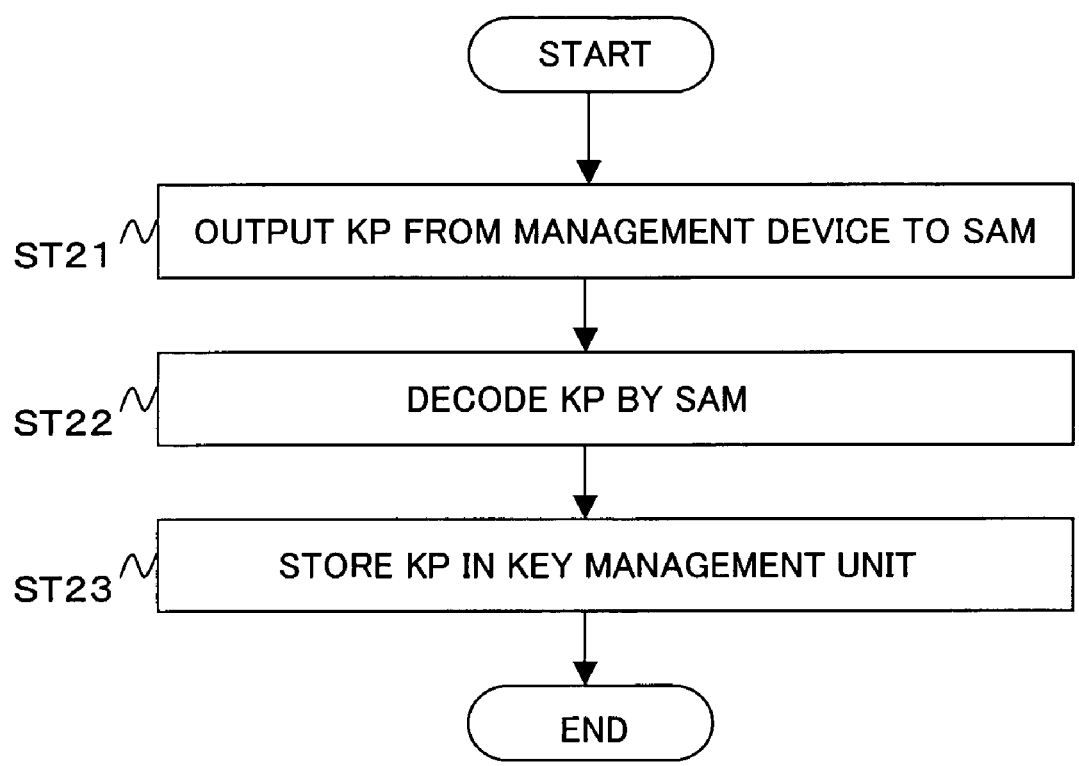
FIG. 10 is a flow chart for explaining a step for registration of key management data in the SAM shown in FIG. 5.

In the example of operation, a case of setting the key management data KMD in the SAM 12 will be explained. FIG. 10 is a flow chart for explaining the example of operation.

Step ST21

The management device 13 shown in FIG. 1 generates the key package data KP obtained by enciphering the key management data KMD by the setting use master key data KPM and outputs this to the SAM 12 as shown in FIG. 6.

Step ST22

The SAM 12 decodes the key package data KP input via the interface 31 in the key management unit 33 shown in FIG. 4 or a not illustrated decoding unit by using the setting use master key data KPM to generate the key management data KMD.

Step ST23

The key management unit 33 holds the key management data KMD generated at step ST22.

SECOND EXAMPLE OF OPERATION

Figure 11:
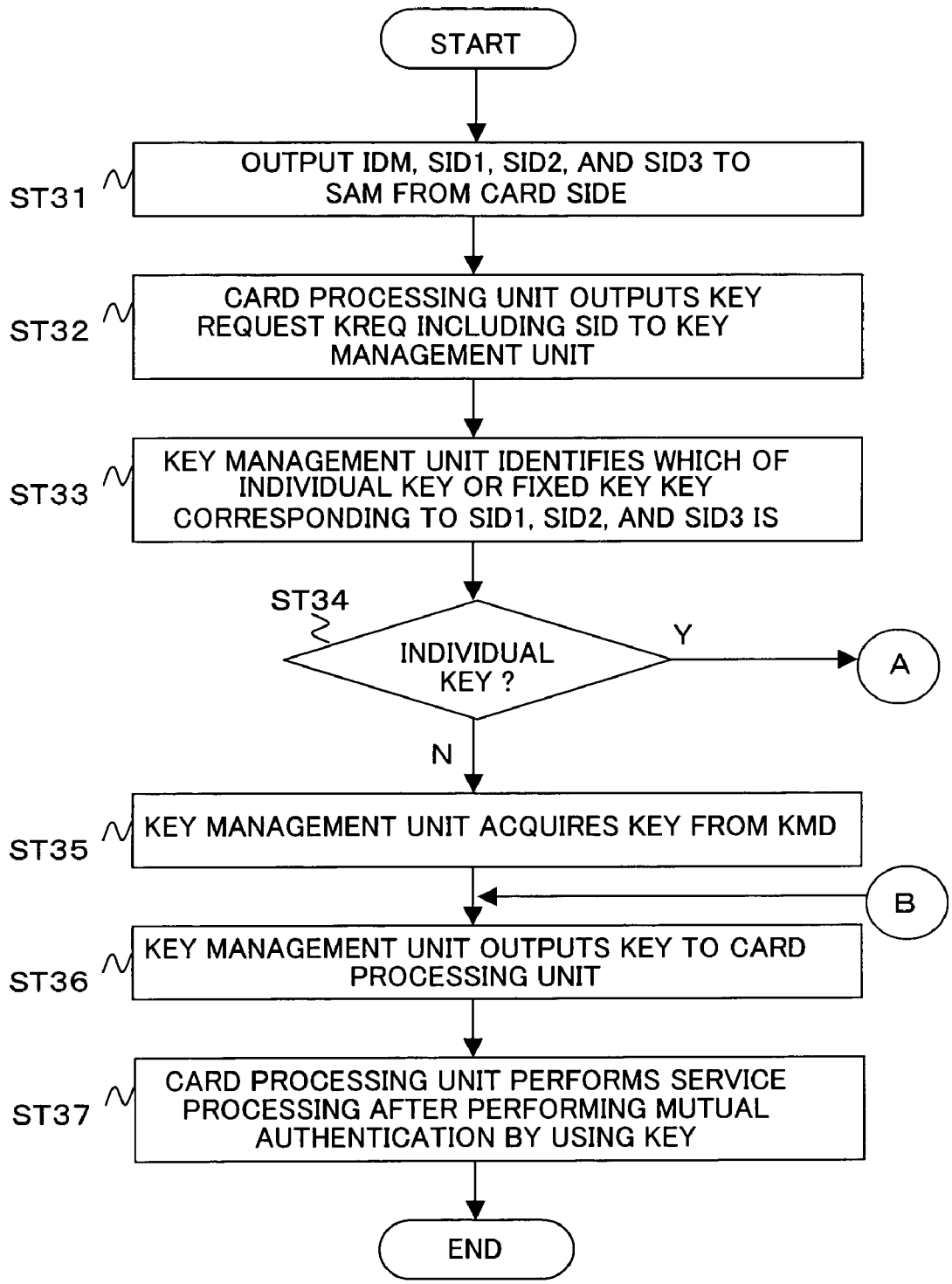
FIG. 11 is a flow chart for explaining an example of the operation in a case of performing processing concerning a service between the IC of the IC card shown in FIG. 5 and the SAM.
Figure 12:
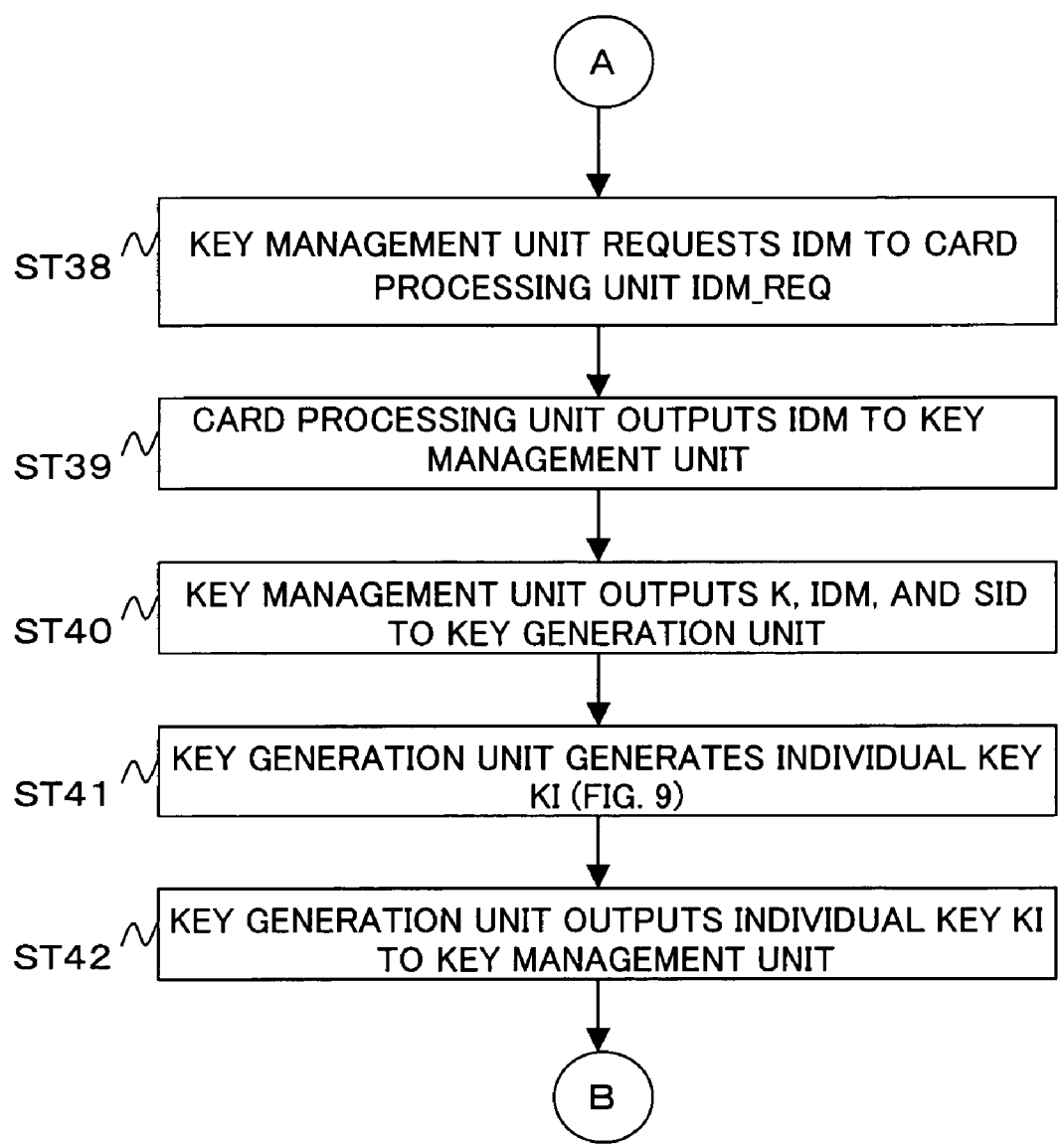
FIG. 12 is a flow chart continuing from FIG. 11 for explaining an example of the operation in the case of performing processing concerning a service between the IC of the IC card shown in FIG. 5 and the SAM.

In this example of operation, an explanation will be given of the example of operation in a case where processing concerning a service is carried out between the IC 15 of an IC card 10b and the SAM 12 based on FIG. 5. FIG. 11 and FIG. 12 are flow charts for explaining this example of operation.

Step ST31

The user swipes the IC card 10 at the R/W 11 shown in FIG. 1 and designates the service desired by using for example an operation unit provided on the R/W 11. Note that, it is also possible for the IC 15 or the SAM 12 to automatically designate the service. Due to this, the IC 15 outputs to the SAM 12 the identification data SID of the designated service and the device identification data IDM read from the memory 22 of the IC 15.

Step ST32

The card processing unit 32 outputs a key request KREQ including the identification data SID input at step ST31 to the key management unit 33.

Step ST33

The key management unit 33 identifies which of the individual key or the fixed key the key data K linked with the identification data SID included in the key request KREQ input at step ST22 is with reference to the key management data KMD.

Step ST34

The key management unit 33 proceeds to step ST35 when the key is identified as a fixed key at step ST33, while proceeds to step ST38 when it is identified as an individual key.

Step ST35

The key management unit 33 refers to the key management data KMD and acquires the key data (fixed key data) corresponding to the individual data SID input at step ST32.

Step ST36

The key management data 33 outputs the key data obtained at step ST35 or the key data input from the key generation unit 34 at step ST42 mentioned later to the card processing unit 32.

Step ST37

The card processing unit 32 performs the mutual authentication with the IC 15 on the basis of the key data input at step ST36 and, when confirming the mutual legitimacy, performs the service processing corresponding to the identification data SID input at step ST31 in cooperation with the IC 15.

Step ST38

The key management unit 33 outputs the request IDM_REQ for requesting the device identification data IDM to the card processing unit 32 when the key is identified as an individual key at step ST34.

Step ST39

The card processing unit 32 outputs the device identification data IDM input from the IC 15 at step ST31 to the key management unit 33 in response to the request IDM_REQ input at step ST38.

Step ST40

The key management unit 33 reads the key data corresponding to the identification data SID from the key management data KMD. Then, the key management unit 33 outputs the key data KO, the device identification data IDM input at step ST39, and the identification data SID input at step ST32 to the key generation unit 34.

Step ST41

The key generation unit 34 generates the individual key data KI by using the key data etc. input at step ST33 by the steps explained by using FIG. 7.

Step ST42

The key generation unit 34 outputs the individual key data KI input at step ST41 to the key management unit 33.

As explained above, in the card system 1, as explained by using FIG. 6, the SAM 12 provides the identification data SID1 to SID3 from the authentication program 80 to the key generation program 81, and the key generation program 81 generates the individual key data KI by using only the identification data SIDF2. For this reason, it can be made difficult for a developer of the authentication program 80 to deduce the key generation algorithm in the key generation program 81 on the basis of the identification data provided to the key generation program 81.

In the SAM 12, firewalls FW1 and FW2 are defined as shown in FIG. 7. Therefore, illegal access to the key generation program 81 by the authentication program 80 can be prevented, and the key generation algorithm in the key generation program 81 can be kept secure.

In the SAM 12, since the authentication program 80 and the key generation program 81 are completely independent programs except for the transfer of data via the functions API1 and API2, development of the authentication program 80 and the key generation program 81 can be proceeded with by different developers in parallel.

Further, by configuring the SAM 12 so that the authentication program 80 and the key generation program 81 independently download the key storage program 82 from the outside of the SAM 12, the key generation program 81 can be updated without exerting an influence upon the key generation program 81. For example, when a business for providing a predetermined service prepares the key generation program 81, even if updating the key storage program 82, the business does not have to update the key generation program 81, so can reduce its load.

Further, in the card system 1, preceding the service processing between the SAM 12 and the IC 15, the SAM 12 generates the individual key data KI unique to the IC 15 on the basis of the device identification data IDM unique to the IC card 10 (IC 15) received from the IC 15 and performs the mutual authentication with the IC 15 on the basis of the individual key data KI. For this reason, even when the secrecy of the individual key data KI of some of the IC cards 10 among the plurality of IC cards 10 is lost, the secrecy of the individual key data of the other IC cards 10 is not lost, and the security can be raised.

Further, according to the card system 1, the identification data SID for identifying a service etc. is output from the IC 15 to the SAM 12, and the algorithm of the individual key generation is switched on the basis of the identification data SID at the SAM 12. Therefore, the secrecy of individual key data based on other algorithms can be kept in the case where the secrecy of some of the algorithms is lost.

Further, according to the card system 1, the identification data SID for identifying a service etc. is output from the IC 15 to the SAM 12 and it is decided which of the individual key or the fixed key the key data to be used for the authentication is on the basis of the identification data SID. Therefore, the IC 15 can perform the processing without awareness as to which of the individual key or the fixed key the key data to be used for the authentication is.

Further, according to the card system 1, the key management unit 33 switches between processing corresponding to an individual key and a fixed key. Therefore the card processing unit 32 can perform processing without identifying which of the individual key or the fixed key the key data to be used for the authentication is. For this reason, the load accompanied by the development of the card processing unit 32 can be reduced and, at the same time, the leakage of information concerning the authentication using an individual key to the developer of the card processing unit 32 can be prevented.

Further, according to the card system 1, by making all key data a fixed key in property in the key property data KPD of the key management data KMD, compatibility with a system using only fixed keys can be obtained.

Further, according to the card system 1, processing concerned with the individual key data is carried out on the basis of the key management data KMD in the key management unit 33 independently from the operation of the card processing unit 32. Therefore the information concerning the individual key data can be kept unknown from the developer of the application program of the card processing unit 32. That is, the information concerning the individual key data can be kept closed to only the setter and/or developer of the key management data KMD and the individual key generation program KPRG, so a high security can be realized.

According to the card system 1, by generating the individual key data on the basis of the device identification data IDM as mentioned above, it is not necessary to store the individual key data of all IC cards 10, so the SAM 12 can be configured by using a small scale memory.

In the embodiments, the IC 15 of the IC card 10 was illustrated as the device to be authenticated of the present invention, but the device to be authenticated may be a computer or the like too.

Summarizing the effects of the present invention, according to the present invention, a data processing device and data processing method able to keep the technique for generation of key data in the key generating means secret from the developer of the authenticating means can be provided. Further, according to the present invention, a program able to keep the algorithm of the key generation secret from the authentication program can be provided.

While the invention has been described with reference to specific embodiments chosen for purpose of illustration, it should be apparent that numerous modifications could be made thereto by those skilled in the art without departing from the basic concept and scope of the invention.

What is claimed is

1. A data processing device comprising:
    an authenticating means for authentication with a device to be authenticated on the basis of key data; and
    a key generating means for generating said key data on the basis of the data received from said authenticating means and providing the same to said authenticating means,
    wherein said authenticating means provides device identification data identifying the device to be authenticated, master key data, original key data, and service identification data to said key generating means, said service identification data including first service identification data corresponding to a first service to be received by a user of the device to be authenticated and second service identification data corresponding to a second service to be received by the user of the device to be authenticated, said key generating means selects one of said first service identification data or said second service identification data, said key generating means selects a key generation algorithm corresponding to selected service identification data from among a plurality of different key generation algorithms, and said key generating means generates said key data by inputting the device identification data, the master key data, the original key data, and the selected service identification data into said selected key generation algorithm.

2. A data processing device as set forth in claim 1, wherein said key generating means generates said key data unique to the device to be authenticated on the basis of the data received from said authenticating means.

3. A data processing device as set forth in claim 1, wherein said key generating means is provided with a function module having a first input parameter and a second input parameter and generating said key data by using only said first data entered for said first input parameter, and said authenticating means enters said first data for said first input parameter of said function module of said key generating means and enters said second data for said second input parameter.

4. A data processing device as set forth in claim 1, wherein said authenticating means provides identification data relating to processing to be performed after said authentication, that is, said first data and said second data received from said device to be authenticated, to said key generating means.

5. A data processing device as set forth in claim 1, wherein said authenticating means provides a function module for performing processing for providing unique data unique to said device to be authenticated received from said device to be authenticated, and said key generating means calls up said function module of said authenticating means and further uses said unique data received from said function module to generate said key data.

6. A data processing device as set forth in claim 5, wherein said authenticating means is realized by executing an authentication program including a function defining said function module by an executing means, and said key generating means is realized by executing a key generation program including a function calling up said function module by said executing means.

7. A data processing device as set forth in claim 5, wherein said authenticating means provides said key generating means with said unique data read from a storage means shared between said authenticating means and said key generating means in accordance with execution of said function module when said function module is called up by said key generating means.

8. A data processing device as set forth in claim 1, wherein said data processing device further comprises a key holding means providing a function module for reading out master key data and holding said master key data, and said key generating means calls up said function module of said key holding means and further uses said master key data obtained by said function module to generate said key data.

9. A data processing device as set forth in claim 8, wherein said key holding means is realized by execution of a key holding program by an executing means.

10. A data processing device as set forth in claim 9, wherein said key holding program is updated independently from programs for realizing said authenticating means and said key generating means.

11. A data processing device as set forth in claim 1, wherein said authenticating means performs authentication with said device to be authenticated on the basis of said key data and, when recognizing mutual legitimacy with said device to be authenticated, performs processing corresponding to said key data in cooperation with said device to be authenticated.

12. A data processing device as set forth in claim 1, wherein said key generating means generates individual key data unique to said device to be authenticated on the basis of said first data unique to said device to be authenticated, and said authenticating means performs first authentication with said device to be authenticated using fixed key data held by said authenticating means and shared with a plurality of device to be authenticated and performs second authentication with said device to be authenticated using said individual key data generated by said key generating means.

13. A data processing device as set forth in claim 12, wherein said authenticating means performs first processing linked with said fixed key data in cooperation with said device to be authenticated after confirming the legitimacy of said device to be authenticated by said first authentication and performs second processing linked with said individual key data in cooperation with said device to be authenticated after confirming the legitimacy of said device to be authenticated by said second authentication.

14. A data processing device as set forth in claim 12, wherein said authenticating means holds original key data linked with said second authentication, and said key generating means generates said individual key data based on unique data received from said device to be authenticated through said authenticating means and said original key data held by said authenticating means.

15. A data processing device as set forth in claim 14, wherein said authenticating means holds identification data of processing to be performed with said device to be authenticated linked with said original key data and provides said key generating means with said original key data linked with said identification data of designated processing, and said key generating means generates said individual key data based on said original key data received by said authenticating means.

16. A data processing method for authentication by an authenticating means with a device to be authenticated on the basis of key data generated by a key generating means, comprising:

receiving from said authenticating means device identification data identifying the device to be authenticated, master key data, original key data, and service identification data at said key generating means, said service identification data including first service identification data corresponding to a first service to be received by a user of the device to be authenticated and second service identification data corresponding to a second service to be received by the user of the device to be authenticated;

generating key data with said key generating means by using only one of said first service identification data or said second service identification data, said generating including selecting a key generation algorithm corresponding to selected service identification data from among a plurality of different key generation algorithms, and said generating including generating said key data by inputting the device identification data, the master key data, the original key data, and the selected service identification data into said selected key generation algorithm;

providing the key data to said authenticating means; and authenticating with said authenticating means the device to be authenticated on the basis of said key data received at said providing.

17. A data processing method as set forth in claim 16, wherein in said generating, said key generating means generates said key data unique to said device to be authenticated on the basis of data received from said authenticating means in said receiving.

18. A data processing method as set forth in claim 16, wherein, in said generating, said key generating means generates said key data using only said first data entered for said first input parameter on the basis of a function module having a first input parameter and second input parameter and in said receiving, said authenticating means enters said first data for said first input parameter of said function module of said key generating means and enters said second data for said second input parameter.

19. A data processing method as set forth in claim 16, wherein, in said generating, said key generating means calls up a function module of said authenticating means and further uses unique data unique to said device to be authenticated obtained on the basis of said function module to generate said key data.

20. A data processing method as set forth in claim 16, wherein, in said generating, said key generating means calls up a function module of key holding means and further uses master key data obtained from said function module and held by said key holding means to generate said key data.

21. A data processing method as set forth in claim 20, further comprising:

updating a key holding program for realizing said key holding means independently from a program for realizing said authenticating means and said key generating means.

22. A computer readable medium including computer executable instructions, wherein the instructions, when executed by a processor, cause the processor to perform a method for providing key data to an authentication program performing authentication with a device to be authenticated on the basis of key data and executed in a data processing device, the method comprising:

receiving device identification data identifying the device to be authenticated master key data, original key data, and service identification data from said authentication program, said service identification data including first service identification data corresponding to a first service to be received by a user of the device to be authenticated and second service identification data corresponding to a second service to be received by the user of the device to be authenticated;

generating said key data by using only one of said first service identification data or said second service identification data, said generating including selecting a key generation algorithm corresponding to selected service identification data from among a plurality of different key generation algorithms, and said generating including generating said key data by inputting the device identification data, the master key data, the original key data, and the selected service identification data into said selected key generation algorithm; and providing said key data generated by said generating to said authentication program.

23. The computer readable medium as set forth in claim 22, wherein said generating generates said key data unique to said device to be authenticated on the basis of said first data received at said receiving.

24. The computer readable medium as set forth in claim 22, wherein said method further comprises:

receiving a first input parameter and a second input parameter; and generating said key data using only said first data entered for said first input parameter, said receiving first data and second data receives said first data and said second data through said first input parameter and said second input parameter of said function, and said generating said key data by using only said first data in said first data and said second data generates said key data using only said first data received through said first input parameter.

25. The computer readable medium as set forth in claim 22, wherein access rights different from said authentication program are defined.

26. A secure application module for communicating with an IC chip storing service date relating to at least one service, comprising:

an authenticating circuit for authentication with a device to be authenticated on the basis of key data; and a key generating circuit for generating said key data on the basis of the data received from said authenticating circuit and providing the same to said authenticating circuit, wherein said authenticating circuit provides device identification data identifying the device to be authenticated, master key data, original key data, and service identification data to said key generating circuit, said service identification data including first service identification data corresponding to a first service to be received by a user of the device to be authenticated and second service identification data corresponding to a second service to be received by the user of the device to be authenticated, said key generating circuit generates said key data by using only one of said first service identification data or said second service identification data, said key generating circuit selects a key generation algorithm corresponding to selected service identification data from among a plurality of different key generation algorithms, and said key generating circuit generates said key data by inputting the device identification data, the master key data, the original key data, and the selected service identification data into said selected key generation algorithm.

27. A data processing device comprising:
an authenticating unit configured to authenticate a device to be authenticated on the basis of key data; and
a key generating unit configured to generate said key data on the basis of the data received from said authenticating unit and to provide the key data to said authenticating unit,
wherein said authenticating unit is configured to provide device identification data identifying the device to be authenticated, master key data, original key data, and service identification data to said key generating unit, said service identification data including first service identification data corresponding to a first service to be received by a user of the device to be authenticated and second service identification data corresponding to a second service to be received by the user of the device to be authenticated, said key generating unit is configured to generate said key data by using only one of said first service identification data or said second service identification data, said key generating unit is configured to select a key generation algorithm corresponding to selected service identification data from among a plurality of different key generation algorithms, and said key generating unit is configured to generate a said key data by inputting the device identification data, the master key data, the original key data, and the selected service identification data into said selected key generation algorithm.

28. A data processing device as set forth in claim 1, wherein said original key data is unique to the device to be authenticated.

29. A data processing device as set forth in claim 1, wherein said original key data is identical for a plurality of devices to be authenticated.

* * * * *